US012797941B2

(12) United States Patent
Kölm

(10) Patent No.: US 12,797,941 B2
(45) Date of Patent: Nov. 17, 2026

(54) RIVETING DEVICE WITH A COMPACT DESIGN

(71) Applicant: SFS Group Germany GmbH, Oberursel (DE)

(72) Inventor: Robert Kölm, Neu-Anspach (DE)

(73) Assignee: SFS Group Germany GmbH, Oberursel (DE)

( * ) Notice: Subject to any disclaimer, the term of this patent is extended or adjusted under 35 U.S.C. 154(b) by 136 days.

(21) Appl. No.: 18/870,817

(22) PCT Filed: Jun. 29, 2023

(86) PCT No.: PCT/DE2023/100491

§ 371 (c)(1),
(2) Date: Dec. 2, 2024

(87) PCT Pub. No.: WO2024/002425

PCT Pub. Date: Jan. 4, 2024

(65) Prior Publication Data

US 2025/0326025 A1 Oct. 23, 2025

(30) Foreign Application Priority Data

Jun. 30, 2022 (DE) ..................... 10 2022 116 406.3

(51) Int. Cl.
*B21J 15/10* (2006.01)
*B21J 15/04* (2006.01)
(Continued)

(52) U.S. Cl.
CPC ........... *B21J 15/105* (2013.01); *B21J 15/043* (2013.01); *B21J 15/26* (2013.01); *B21J 15/326* (2013.01);
(Continued)

(58) Field of Classification Search
CPC .......... B21J 15/10; B21J 15/105; B21J 15/16; B21J 15/26
See application file for complete search history.

(56) References Cited

U.S. PATENT DOCUMENTS 2,789,619 A 4/1957 Wing et al.
3,410,128 A 11/1968 Suater et al.
(Continued)

FOREIGN PATENT DOCUMENTS

CN 201431990 Y 3/2010
CN 204565044 U * 8/2015 ............ B21J 15/326
(Continued)

OTHER PUBLICATIONS

Translation of WO-2018139372-A1.*
Translation of CN-204565044-U.*

*Primary Examiner* — Bobby Yeonjin Kim
(74) *Attorney, Agent, or Firm* — Smartpat PLC

(57) ABSTRACT

A riveting device (1) includes a riveting tool (10), an electromechanical drive device (30) and a device housing (50) which receives the electromechanical drive device (30). The electromechanical drive device (30) includes an electric motor (31) having an output shaft (31.1) and a spindle gear (32) which is operatively connected to said output shaft. The spindle gear (32) is set up to convert a rotational drive movement coming from the output shaft (31.1) into a translational drive movement which acts along an operative axis (W) to actuate the riveting tool (10). The spindle gear (32) is mounted radially in relation to the operative axis (W) via a radial bearing (33) in a bearing housing (34). To reduce the overall size, the bearing housing (34) is formed on the device housing (50).

14 Claims, 4 Drawing Sheets

(51) Int. Cl.

| | |
|---|---|
| ***B21J 15/26*** | (2006.01) |
| ***B21J 15/32*** | (2006.01) |
| ***B25B 27/00*** | (2006.01) |
| ***B25F 5/00*** | (2006.01) |
| ***B25F 5/02*** | (2006.01) |

(52) U.S. Cl.

CPC .......... *B25B 27/0014* (2013.01); *B25F 5/001* (2013.01); *B25F 5/02* (2013.01)

(56) References Cited

U.S. PATENT DOCUMENTS

| | | | | |
|---|---|---|---|---|
| 3,605,478 | A | 9/1971 | Chirco | |
| 4,541,266 | A | 9/1985 | Totsu | |
| 4,612,793 | A | 9/1986 | Klein | |
| 5,473,805 | A | 12/1995 | Wille | |
| 5,511,298 | A | 4/1996 | Gasser | |
| 5,598,619 | A | 2/1997 | Rosier | |
| 5,605,070 | A | 2/1997 | Wille | |
| 6,425,170 | B1 | 7/2002 | Zirps et al. | |
| 7,032,281 | B1 | 4/2006 | Lin | |
| D1,021,594 | S | 4/2024 | Schönberner | |
| 2001/0020322 | A1 | 9/2001 | Wille | |
| 2004/0112178 | A1 | 6/2004 | Gilbert et al. | |
| 2015/0336159 | A1* | 11/2015 | Gaertner | B25B 27/0014 29/243.526 |
| 2016/0114383 | A1* | 4/2016 | Honsel | B25B 27/0014 29/525.07 |
| 2018/0126446 | A1* | 5/2018 | Mori | B21J 15/28 |
| 2019/0283111 | A1 | 9/2019 | Kawai et al. | |
| 2020/0130047 | A1 | 4/2020 | Yabunaka et al. | |
| 2020/0139424 | A1 | 5/2020 | Yabuguchi et al. | |
| 2021/0069773 | A1* | 3/2021 | Yabunaka | B21J 15/105 |
| 2021/0245236 | A1 | 8/2021 | Ko | |
| 2021/0379646 | A1 | 12/2021 | Killen | |
| 2021/0394253 | A1 | 12/2021 | Yabunaka et al. | |
| 2022/0134412 | A1 | 5/2022 | Teng et al. | |
| 2022/0355362 | A1 | 11/2022 | Izutsu et al. | |

FOREIGN PATENT DOCUMENTS

| | | | | |
|---|---|---|---|---|
| CN | 104999410 | A | 10/2015 | |
| DE | 10011305 | A1 | 9/2001 | |
| DE | 60212091 | T2 | 12/2006 | |
| DE | 60214540 | T2 | 9/2007 | |
| DE | 102016224555 | A1 | 6/2018 | |
| DE | 102017215097 | A1 | 2/2019 | |
| DE | 102020122949 | A1 | 3/2021 | |
| DE | 102022110864 | A1 | 11/2022 | |
| DE | 102022116406 | A1 | 1/2024 | |
| DE | 102022116431 | A1 | 1/2024 | |
| EP | 0116954 | A2 | 8/1984 | |
| EP | 0527414 | A1 | 2/1993 | |
| EP | 0593720 | A1 | 4/1994 | |
| EP | 0670199 | A1 | 9/1995 | |
| EP | 1132160 | A1 | 9/2001 | |
| EP | 1525928 | A2 | 4/2005 | |
| EP | 2910321 | A1 | 8/2015 | |
| EP | 3643425 | A1 | 4/2020 | |
| EP | 3957441 | A1 | 2/2022 | |
| JP | S6127537 | A | 2/1986 | |
| WO | 02098585 | A2 | 12/2002 | |
| WO | 2015049738 | A1 | 4/2015 | |
| WO | WO-2018139372 | A1 * | 8/2018 | B21J 15/022 |
| WO | 2024002426 | A1 | 1/2024 | |
| WO | 2024002427 | A1 | 1/2024 | |
| WO | 2024002428 | A1 | 1/2024 | |
| WO | 2024002429 | A1 | 1/2024 | |
| WO | 2024002430 | A1 | 1/2024 | |

* cited by examiner

RIVETING DEVICE WITH A COMPACT DESIGN

CROSS-REFERENCE TO RELATED APPLICATION

This application is a national stage application, filed under 35 U.S.C. § 371, of International Patent Application PCT/DE2023/100491, filed on Jun. 29, 2023, which claims the benefit of German Patent Application DE 10 2022 116 406.3, filed on Jun. 30, 2022.

TECHNICAL FIELD

The present disclosure refers to a riveting device and in particular a blind rivet setting tool, a blind rivet nut setting tool and a blind rivet screw setting tool.

BACKGROUND

Riveting devices are typically used to produce a rivet connection between two or more materials, such as for example metal sheets, at a connection point at which the materials are placed on each other. To form the rivet connection, a plastically deformable, often cylindrical connecting element is used which is generally referred to as a rivet. The rivet usually has a rivet head prefabricated on one end. To produce the rivet connection, the rivet is inserted into a connection hole at the connection point up to the rivet head and then the other end of the rivet is plastically deformed to form a closing head.

Riveting devices can also be used to provide components with a thin wall with a thread. Rivet nuts or rivet screws are used for this, with which a rivet is combined with an element comprising a thread. The rivet nuts or rivet screws are introduced into a prefabricated rivet hole of the component and subsequently a region of the rivet is plastically deformed to form a closing head.

Commonly used riveting devices usually comprise a riveting tool which is set up to cause a plastic deformation forming the closing head. To actuate the riveting tool, the riveting devices have a drive device which is often electromechanical and, for example, comprises an electric motor and a spindle gear, formed as a ball screw drive. Such a riveting device is described in EP 0 670 199 A1 and is referred to therein as a setting device. The riveting device is designed for setting blind rivet nuts and set up to subject the blind rivet nut to a compression that produces a closing head by exerting a pull movement on a threaded rivet mandrel.

SUMMARY

In the course of continuous further development, there may be a need to improve the compactness of a riveting device. This is based on the expectation that improved compactness will make it easier to reach hard-to-reach riveting points in order to set a rivet there. It is also expected that improved compactness will make the riveting device lighter and/or easier to handle.

One embodiment of a basic riveting device comprises a riveting tool, an electromechanical drive device and preferably a device housing in which the electromechanical drive device is received. Preferably, the electromechanical drive device has an electric motor having an output shaft and a gear that is operatively connected to it, in particular a spindle gear. The spindle gear is preferably set up to convert a rotational drive movement coming from the output shaft into a translational drive movement which acts along an operative axis to actuate the riveting tool. In particular, the spindle gear is mounted radially in relation to the operative axis via a radial bearing in a bearing housing.

For example, the riveting device, in particular the riveting tool, is suitable for blind riveting, during which the riveting process is carried out from one side of the material to be provided with a blind rivet. A blind rivet nut or a blind rivet screw can also be used instead of a blind rivet.

An improvement in compactness is offered by an embodiment of the riveting device in which the bearing housing for the radial bearing of the spindle gear is formed on the device housing. This avoids the need for a separate bearing housing for mounting the radial bearing and the radial installation space to be provided for the separate bearing housing can be reduced. Eliminating the separate bearing housing also results in a weight advantage.

The improved riveting device can be designed in such a way that the bearing housing is moulded onto the device housing. For example, the bearing housing and the device housing are connected to each other in one piece. This favours simple and/or cost-effective production of the bearing housing, as the bearing housing can be produced at the same time as the appliance housing.

The improved riveting device can also be designed such that the device housing is, at least in the region of the bearing housing, a plastic housing which comprises or consists of a plastic material. This favours a lightweight design of the riveting device, in particular at relatively low material costs.

The improved riveting device can also be designed such that the radial bearing has a deformation-resistant, in particular bending-resistant outer ring, which is held in the bearing housing, for example is held in a non-rotatable or rotatable manner. This counteracts a possible loss of stability in the region of the bearing housing, which can occur, for example, if the bearing housing is a plastic housing or is the plastic housing described above. For example, the outer ring has or consists of a metallic material.

The improved riveting device can also be designed in such a way that the radial bearing is designed as a thin section bearing. This further improves the compactness of the riveting device in the radial direction, especially if the riveting device has the protruding outer ring, which is then designed as a thin ring of the thin section bearing.

In one embodiment, the riveting device comprises a spring element, which applies a force to at least one clamping element of the riveting tool. In this case, the improved riveting device can be designed such that the radial bearing has an axial bearing function for absorbing a counterforce coming from the spring element. The radial bearing thus acts radially in relation to the spindle gear and axially in relation to the spring element. This dual function of the radial bearing results in improved functional integration.

The improved riveting device can also be designed in such a way that the radial bearing is supported axially against the bearing housing only in the direction of the counterforce caused by the spring element. This favours a compact design of the bearing housing, as the dimensioning of the bearing housing in the axial direction is only based on the spring force of the spring element and not on the much higher force of the spindle gear, which acts in the opposite axial direction during the riveting process.

The improved riveting device can also be designed in such a way that the radial bearing is designed as a roller bearing, in particular a deep groove ball bearing. This favours a reduction in costs. The deep groove ball bearing is also suitable if the radial bearing is to have the axial bearing function described above.

In a further embodiment, the device housing is made up of several parts and comprises at least two housing shells placed on each other in a parting plane, wherein the operative axis extends in the parting plane or parallel to it. In this case, the improved riveting device can be designed such that at least one peripheral portion of the bearing housing is formed on the housing shells, in particular a circumferential section of the bearing housing is formed on the respective housing shell, in particular is moulded onto it. This makes it easier to assemble the riveting device, at least in the area of the radial bearings of the spindle gear.

In a further embodiment, the spindle gear comprises a threaded spindle and a spindle nut which is engaged with it. In this case, for example, the threaded spindle is set up to perform the translational drive movement for actuating the riveting tool, and the spindle nut is mounted radially with respect to the operative axis by the radial bearing and, in particular, is driven by the electric motor.

Further progress is achieved additionally or alternatively by an embodiment in which the spindle gear is mounted axially in relation to the operative axis via an axial bearing in a deformation-resistant, preferably separate support ring, serving as a bearing housing, and the support ring is supported in the axial direction on a mouthpiece via a deformation-resistant, in particular a bending-resistant tool housing. As a result, the relatively high axial forces of the spindle gear acting on the axial bearing during operation of the riveting device are specifically absorbed in such a way that the device housing is bypassed. Accordingly, the device housing can be designed for a lower maximum load and thus be more compact.

Furthermore, the mouthpiece and the tool housing are components of the riveting device that are used to absorb forces and which, as part of the riveting tool, are more stable anyway due to their function. For example, a mandrel holder for fixing a rivet mandrel of a rivet to be set, in particular a blind rivet, is received in the tool housing and can be displaced in it along the operative axis relative to the mouthpiece. For example, the mandrel holder comprises a chuck housing that can be moved towards the mouthpiece along or in the direction of the operative axis and at least one clamping element, in particular clamping jaw, that can be moved in the chuck housing along a clamping path.

For example, the mouthpiece is fixed on the tool housing, by way of which the rivet mandrel is introduced into the mandrel holder. The axial bearing can be an axial roller bearing, in particular an axial deep groove ball bearing, for example. In principle, the axial bearing can also be an axial needle bearing.

In a further embodiment, at least one reduction stage is interposed between the electric motor and the spindle gear. The improved riveting device can be obtained in this case so that the at least one reduction stage is radially mounted via a radial bearing in a shaft bearing housing, which is formed on the device housing, in particular moulded thereon. Therefore, a separate shaft bearing housing for radially mounting the at least one reduction stage is avoided and the radial installation space to be provided for the separate shaft bearing housing can be reduced. This also results in a weight advantage with respect to the at least one reduction stage by eliminating the separate shaft bearing housing. The at least one reduction stage can be a spur gear or an epicyclic gear train, such as a planetary gear train, for example.

In a further embodiment, the riveting device is formed as a hand riveting device and comprises a handle part which is formed for example on the device housing, in particular is moulded on it. The riveting device can be held in the hand or manually guided by the handle part. In particular, the handle part allows the riveting device to be positioned manually at a point to be riveted. For example, a switching element is assigned to the handle part by means of which the electric motor is started in order to actuate the riveting tool.

According to one aspect, a blind rivet setting tool is proposed. The blind rivet setting tool comprises the above-described riveting device and has a rivet mandrel received in its mandrel holder of a blind rivet to be set.

According to a further aspect, a blind rivet nut setting tool is proposed. The blind rivet nut setting tool comprises the above-described riveting device and has a threaded rivet mandrel received in its mandrel holder for a blind rivet nut to be set.

According to a further aspect, a blind rivet screw setting tool is proposed. The blind rivet screw setting tool comprises the above-described riveting device and has a threaded rivet mandrel received in its mandrel holder of a blind rivet screw to be set.

BRIEF DESCRIPTION OF THE DRAWINGS

Further characteristics and features result from the following description of several exemplary embodiments with reference to the drawing, which shows.

DETAILED DESCRIPTION

Figure 1:
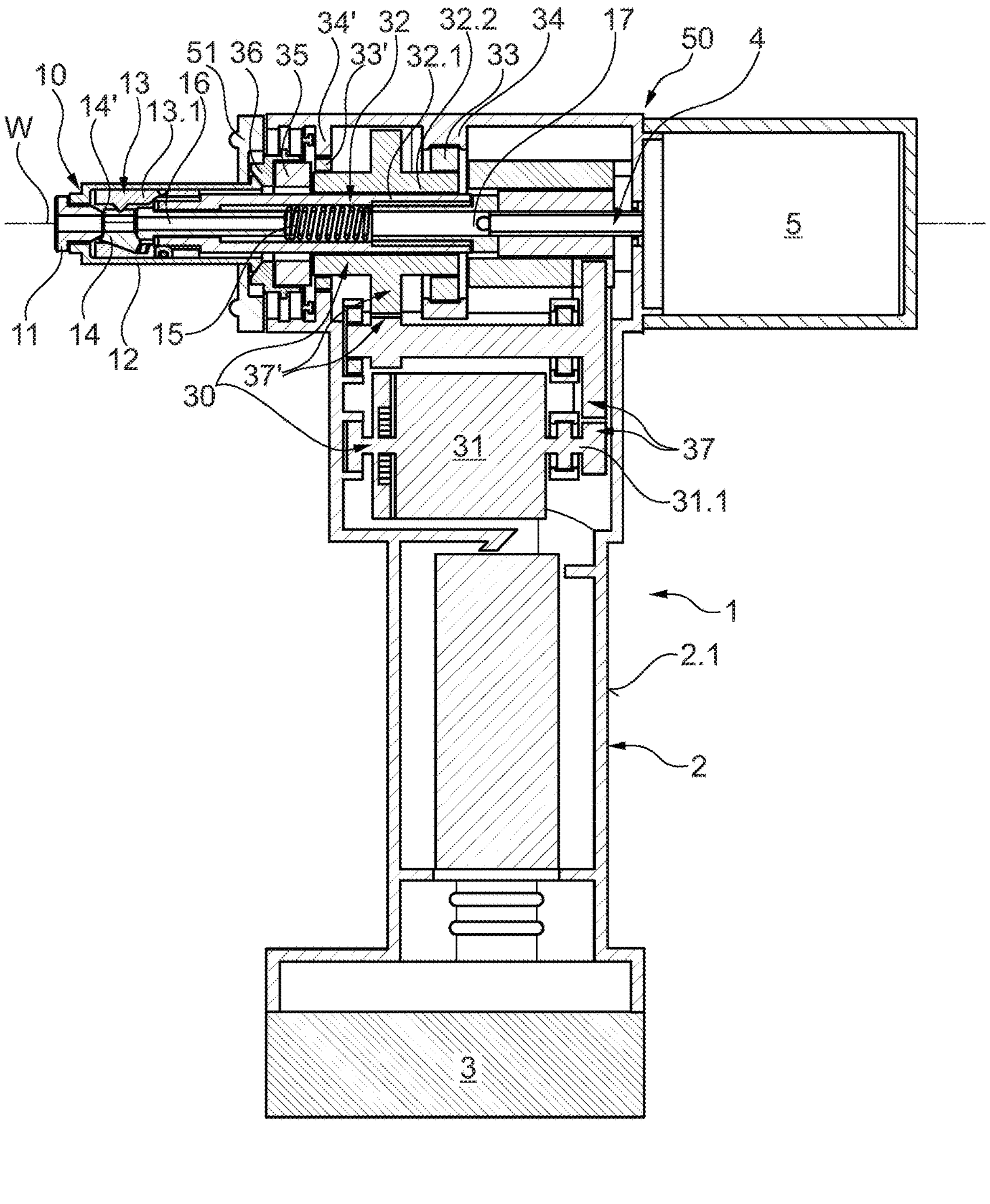
FIG. 1 an exemplary embodiment of a riveting device having a riveting tool and a drive device for actuating the riveting tool in a schematic sectional representation, FIG. 2 the exemplary riveting device in an enlarged section of FIG. 1 in the region of the riveting tool and a spindle gear, which is operatively connected to it, FIG. 3 the exemplary riveting device in an enlarged section of FIG. 1 in the region of the drive device, FIG. 4 an exemplary embodiment of a device housing for the riveting device of FIG. 1, as a double shell embodiment in a perspective representation, FIG. 5 a half shell of the device housing of FIG. 4 in a side view, FIG. 6 a possible embodiment of a blind rivet setting tool having the exemplary riveting device of FIG. 1 in a schematic partial representation, FIG. 7 a possible embodiment of a blind rivet nut setting tool having the exemplary riveting device of FIG. 1 in a schematic partial representation, and FIG. 8 a possible embodiment of a blind rivet screw setting tool having the exemplary riveting device of FIG. 1 in a schematic partial representation.

FIG. 1 shows the construction of an exemplary embodiment of a riveting device 1 which is also referred to as a setting device by experts. The exemplary riveting device 1 is suitable for applying rivets according to the blind riveting method, and in this regard is designed for using blind rivets.

The exemplary riveting device 1 comprises a riveting tool 10 and a drive device 30 for actuating the riveting tool 10. Preferably, the riveting tool 10 is received in a tool housing 12. Preferably, the drive device 30 is received in a device housing 50. Preferably, the tool housing 12 is a metal housing. Preferably, the device housing 50 is a plastic housing.

Preferably, the drive device 30 is an electromechanical drive device. The electromechanical drive device 30 comprises for example an electric motor 31 having a rotatable output shaft 31.1 and preferably a spindle gear 32, which can be driven by the electric motor 31. Preferably, the spindle gear 32 is set up to convert a rotational drive movement coming from the output shaft 31.1 into a translational drive movement which acts along an operative axis W to actuate the riveting tool 10. The spindle gear 32 can be a ball screw drive.

Figure 2:
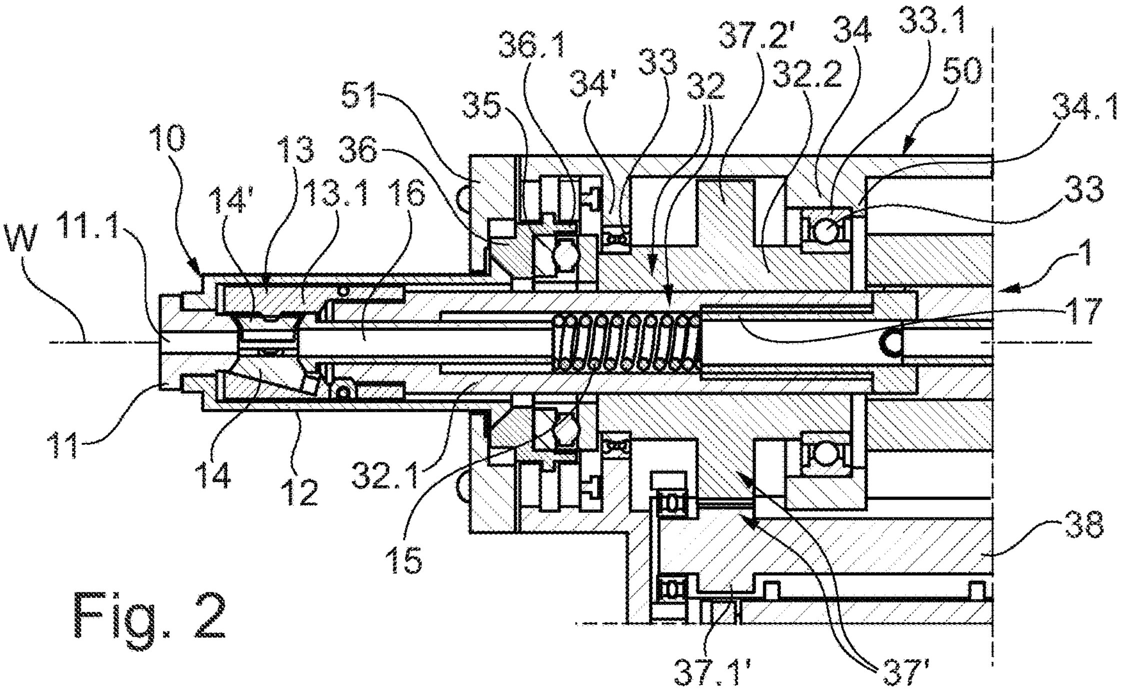

FIG. 2 shows the exemplary riveting device 1 in the region of the riveting tool 10 and of the spindle gear 32 in an enlarged section of FIG. 1. As can be seen in particular, the riveting tool 10 can comprise a mouthpiece 11, a mandrel holder 13, which can be moved against the mouthpiece 11 in the direction of an operative axis W. For example, the mandrel holder 13 has a chuck housing 13.1 and at least one, preferably more clamping elements 14, 14', in particular clamping jaws, which can be moved in the chuck housing 13.1 along a clamping path. Preferably, the mouthpiece 11 and/or the mandrel holder 13 and/or the chuck housing 13.1 and/or the clamping elements 14, 14' are a metal part.

The mouthpiece 11 is used, for example, to receive a blind rivet (not shown in FIGS. 1 and 2) to be set and preferably has a through hole 11.1 in order to introduce the rivet mandrel of the blind rivet therein. The chuck housing 13 having the clamping elements 14, 14' arranged moveably therein serves, for example, to fix the rivet mandrel in the chuck housing 13, so that a non-displaceable connection between the received rivet mandrel and the chuck housing 13 is created.

The riveting tool 10 can be actuated by the drive device 30 so that the mandrel holder 13 or the chuck housing 13.1 with the rivet mandrel fixed therein is moved away from the mouthpiece 11 in the direction of the operative axis W. This happens, for example, by the drive device 30 pulling the mandrel holder 13 or the chuck housing 13.1 away from the mouthpiece 11. This mode of operation, which is known per se, and the blind riveting which can be carried out with it is described in more detail in the publication EP 0 116 954 A2, to which reference is hereby made for the purpose of completing and supplementing the present disclosure, with the note that the publication may attach a meaning to identically worded terms which differs from the present meaning.

Preferably, the mouthpiece 11 is fixed to the tool housing 12, for example screwed to it. Preferably, the mandrel holder 13 or the chuck housing 13.1 is received in the tool housing 12 so as to be movable in the direction of the operative axis W. For example, the tool housing 12 is tubular. For example, the mouthpiece 11 is fixed on one end of the tool housing 12 and the opposite end faces towards the device housing 50.

Preferably, the spindle gear 32 is arranged in the device housing 50. Preferably, the spindle gear 32 comprises a threaded spindle 32.1 and a spindle nut 32.2 that is or can be engaged with the latter. Preferably, the threaded spindle 32.1 and the spindle nut 32.2 are arranged concentrically to each other with regard to a transmission axis. Preferably, the output shaft 31.1 of the electric motor 31 is arranged axially parallel to the transmission axis. Preferably, the transmission axis is on the operative axis W.

For example, the threaded spindle 32.1 and the spindle nut 32.2 are set up in such a way that the spindle nut 32.2 is the gear element that is or can be driven by the electric motor 31 and the threaded spindle 32.1 is used for performing the translational drive movement in order to actuate the riveting tool 10. For example, the spindle nut 32.2 is mounted rotatably in the device housing 50 and the threaded spindle 32.1 is secured against rotation relative to the device housing 50.

For example, the threaded spindle 32.1 is also operatively connected to the mandrel holder 13 or the chuck housing 13.1. This operative connection can be realised in that the threaded spindle 32.1 is directly connected with one end or end section to the mandrel holder 13 or the chuck housing 13.1. For example, the threaded spindle 32.1 and the mandrel holder 13 or the chuck housing 13.1 are screwed together.

Preferably, the threaded spindle 32.1 is formed as a hollow spindle with a through hole extending in the direction of its longitudinal extension. The through hole makes it possible to remove from the riveting tool 10 any rivet mandrel remaining from a riveting process, for example via a tubular element 4, and to supply it to a collection container 5. Preferably, the collection container 5 is arranged fixed integral with the housing relative to the device housing 50, in particular arranged releasably.

In the exemplary riveting device 1, the device housing 50 is used for radially mounting the spindle gear 32. FIGS. 1 and 2 show a possible embodiment as an example. The radial mounting of the spindle gear 32 takes place directly in the device housing 50. This can be realised in that the spindle gear 32 is radially mounted via a radial bearing 33 in a bearing housing 34 and the bearing housing 34 is formed on the device housing 50, for example moulded onto it. Preferably, the bearing housing 34 is therefore formed by the device housing 50. Therefore, installation space can be reduced in the radial direction. Simultaneously, in this manner, components for the radial mounting can be reduced.

Preferably, the radial bearing 33 has a bend-resistant outer ring 33.1 (FIG. 2) which is held in the bearing housing 34. This enables a sufficiently durable radial mounting function, even if the bearing housing 34 as a component of the device housing 50 is a plastic housing. For example, the radial bearing 33 is a roller bearing, in particular a deep groove ball bearing. In order to further improve the compactness of the riveting device 1 in the radial direction in relation to the transmission axis or the operative axis W, the radial bearing 33 is a thin section bearing.

With the exemplary riveting device 1, the radial bearing 33 is assigned by way of example to the spindle nut 32.2, i.e. the spindle nut 32.2 is mounted by the radial bearing 33. Preferably, the radial bearing 33 is attached to the outer circumference of the spindle nut 32.2. Preferably, another radial bearing 33' is provided for radially mounting the spindle nut 32.2, which is arranged in relation to the transmission axis at an axial distance from the radial bearing 33. Preferably, a drive point is located between the radial bearing 33 and the other radial bearing 33', by which the electric motor 31 is operatively connected to the spindle nut 32.2.

Preferably, the device housing 50 is similarly used for radially mounting the spindle nut 32.2 via the other radial bearing 33'. This can be realised in the same manner as with the radial bearing 33, in that the radial mounting takes place directly in the device housing 50 via the other radial bearing 33'. For example, another bearing housing 34' is provided for receiving the other radial bearing 33' and this other bearing housing 34' is formed on the device housing 50, for example moulded thereon.

An axial mounting of the spindle gear 32 takes place preferably via a separate axial bearing 35 in order to be able to absorb an axial force of the spindle gear to a sufficient degree that acts during operation of the riveting device 1. In the exemplary riveting tool 1, for example, the spindle nut 32.2 is mounted axially with respect to the transmission axis or the operative axis W via the axial bearing 35 in a support ring 36, for example serving as a bearing housing, wherein the support ring 36 is supported on the mouthpiece 11 in the axial direction via the tool housing 12. The tool housing 12 itself is held on the support ring 36, in particular held loosely, via a retaining structure 51, such as for example a ring-shaped cover element.

For example, the support ring 36 has a circumferential axial end section 36.1 which serves to position the axial bearing 35 in the radial direction. Preferably, the support ring 36 is designed to be resistant to deformation and pressure. For example, the support ring 36 is a metal part. For example, the support ring 36 is a separate component. For example, the axial bearing 35 is an axial roller bearing. In principle, the axial bearing 35 can also be a needle bearing.

One of the radial bearings 33, 33' for the spindle gear 32, in particular the radial bearing 33, can also have an axial bearing function. The additional axial bearing function lends itself to receive a counterforce coming from a spring element 15. The spring element 15 can be provided in order to apply a spring force to the clamping elements 14, 14' in the direction of the chuck housing 13.1. Therefore, the clamping elements 14, 14' are pushed into a clamping position against a rivet mandrel of a blind rivet which has been introduced via the through hole 11.1 of the mouthpiece 11 into the chuck housing 13.1.

For example, the spring element 15 is supported on the one hand against a counter holder 17 that is fixed against displacement relative to the threaded spindle 32.1 and on the other hand it acts via a pressure part 16, such as a pressure sleeve, on at least one of the clamping elements 14, 14'. For example, the threaded spindle 32.1 is designed as a hollow spindle and the pressure part 16 is received therein via one end so that it can be displaced relative to the threaded spindle 32.1 and the counter holder 17 is fastened, in particular screwed, to the threaded spindle 32.1 via the other end. For example, the spring element 15 is arranged in the threaded spindle 32.1 between the pressure part 16 and the counter holder 17. For example, the spring element 15 is a compression spring.

The axial bearing function of the one radial bearing 33 serves, preferably exclusively, to receive the relatively low counterforce from the spring element 15. The bearing housing 34 is also designed in a corresponding manner, for example. The bearing housing 34 has an axial contact surface 34.1 on one side only, for example, so that the radial bearing 33 is supported axially against the bearing housing 34 solely in the direction of the counterforce caused by the spring element 15. For example, the radial bearing 33 is arranged in the region of the rear axial end of the spindle nut 32.2. The end of the spindle nut 32.2 facing away from the riveting tool 10 can be seen below the rear axial end. The other radial bearing 33' is arranged for example in the region of the front axial end of the spindle nut 32.2.

Figure 3:
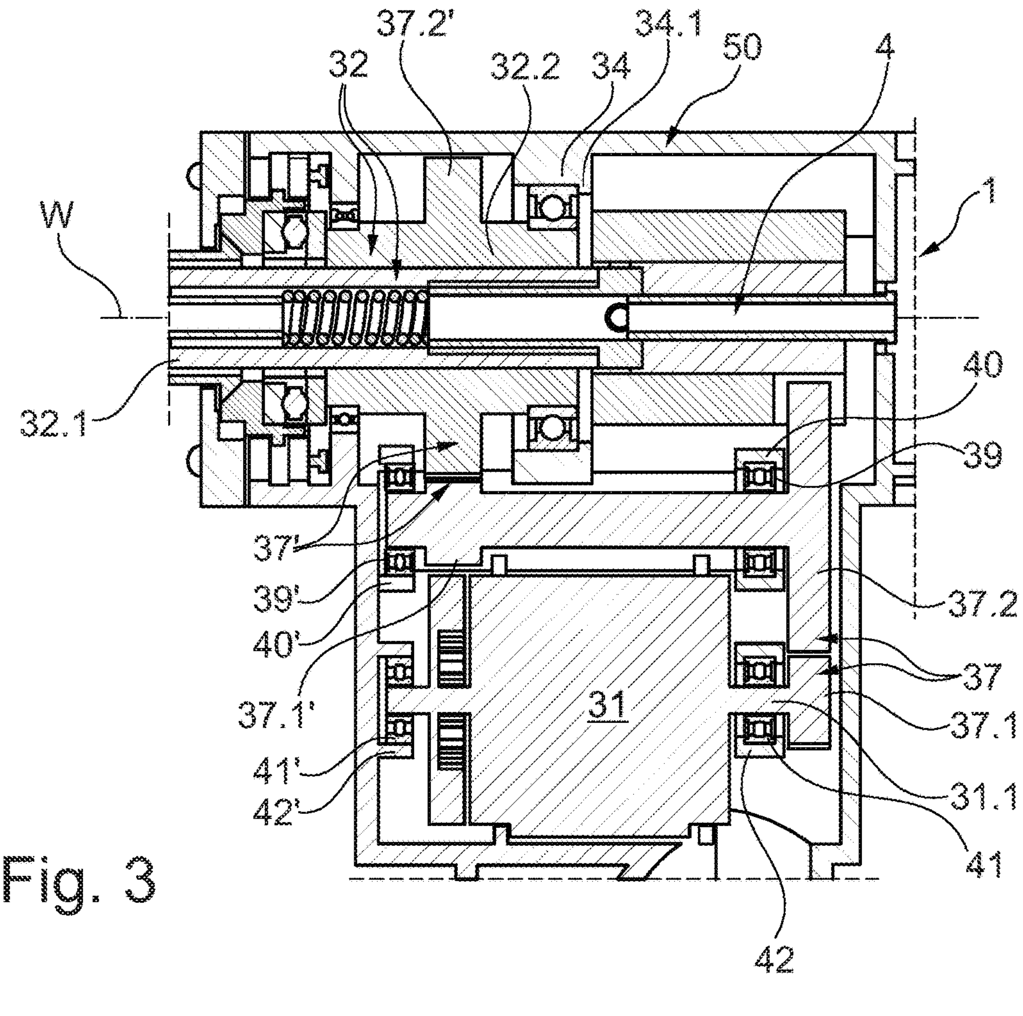

FIG. 3 shows the exemplary riveting device 1 in the region of the drive device 30 in an enlarged section. As can be seen clearly, at least one reduction stage 37 can be interposed between the electric motor 31 and the spindle gear 32. For radially mounting the at least one reduction stage 37, the device housing 50 can similarly be used, for example in that the radial mounting takes place directly in the device housing 50 via a further radial bearing 39. For example, to receive the other radial bearing 39, a shaft bearing housing 40 which is formed on the device housing 50, for example moulded on, is provided.

With the exemplary riveting device 1, the at least one reduction stage 37 has, for example, an intermediate shaft 38. Preferably, the intermediate shaft 38 is radially mounted in the shaft bearing housing 40 via the above-described radial bearing 39. Preferably, another radial bearing 39' is provided as a second radial bearing for the intermediate shaft 38. Preferably, the second radial bearing 39' is received in a further shaft bearing housing 40', which is formed on the device housing 50, for example moulded thereon. For example, in addition to the one reduction stage 37, a further reduction stage 37' is interposed between the electric motor 31 and the spindle gear 32, wherein the reduction stages 37, 37' are connected in series in the power flow and utilise the intermediate shaft 38 as a common intermediate shaft.

Preferably, the one radial bearing 39 radially supports the intermediate shaft 38 between gear elements 37.1, 37.1' of the reduction stage 37, 37' mounted thereon. The gear elements 37.1, 37.1' are each engaged with associated gear elements 37.2, 37.2' of the reduction stages and 37, 37', by which a gear element 37.1 is assigned to the output shaft 31.1 of the electric motor 31 and another gear element 37.2' is assigned to the spindle nut 32.2, in particular they are arranged thereon in a rotationally fixed manner. For example, at least one of the reduction stages 37, 37' is a spur gear stage and the associated gear elements 37.1, 37.2 or 37.1', 37.2' are spur gear wheels.

The device housing 50 can also be used for the radial mounting of the electric motor 31, for example by providing the radial mounting via radial bearings 41, 41' directly in the device housing 50. For example, further shaft bearing housings 42, 42' are formed on the device housing 50, in particular moulded thereon. In this manner, mounting of the electric motor 31 can be realised.

Figure 4:
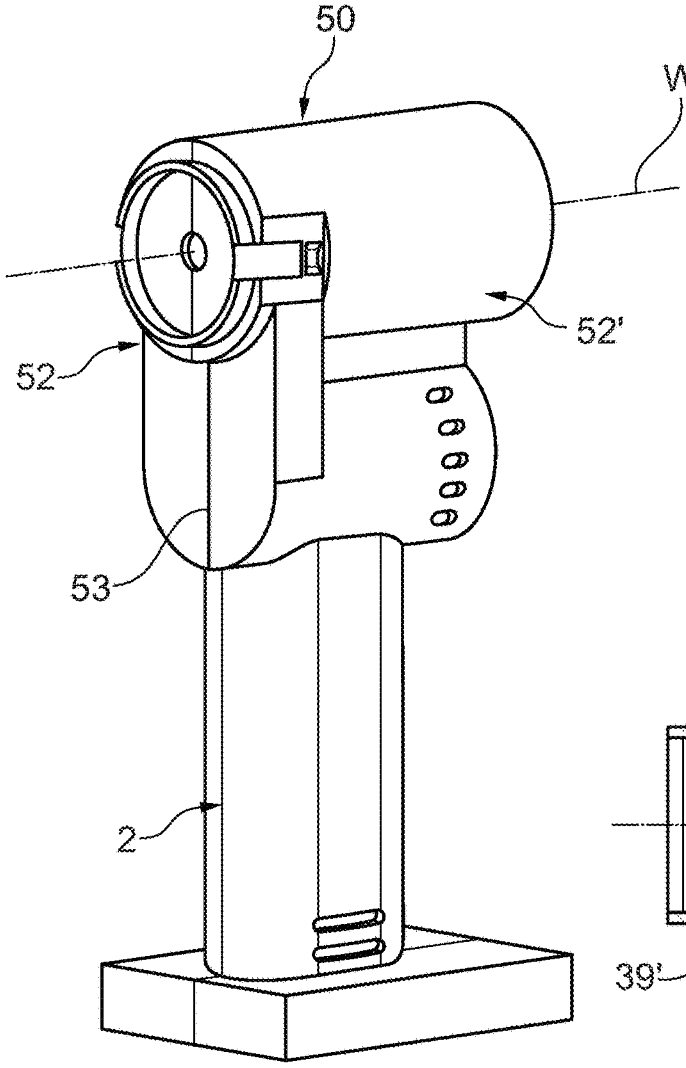
Figure 5:
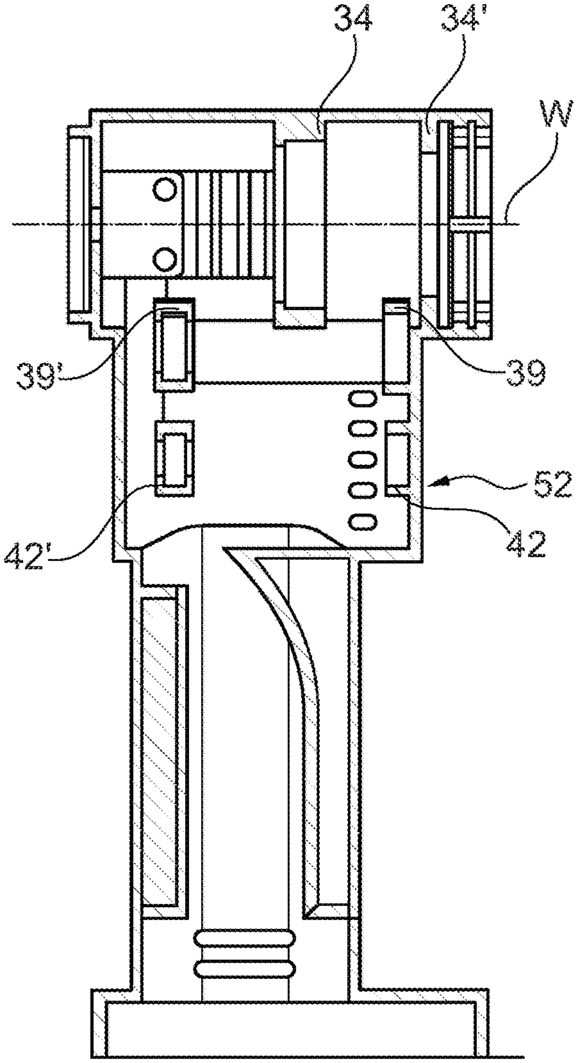

FIG. 4 shows an exemplary embodiment of the device housing 50 for the riveting device 1. The device housing 50 can be made up of several parts and can, for example, comprise at least two housing shells 52, 52' placed on each other in a parting plane 53. For example, the housing shells 52, 52' are half shells. FIG. 5 shows an example of one of the housing shells 52, 52', in particular the housing shell 52 in a view of its interior or of the parting plane 53.

As can be clearly seen from this, material mouldings can be provided on wall sections of the housing shell 52, which form the bearing housings described above, for example the bearing housings 34 and 34' for the spindle gear 32 and/or the shaft bearing housings 40, 40' for the at least one reduction stage 37 and/or the shaft bearing housings 42, 42' for the electric motor 31. Preferably, a circumferential section of the corresponding bearing housing is formed on the respective housing shell 52 or 52'.

The riveting device 1 can be a hand riveting device. The hand riveting device 1 has a gripping surface 2.1, for example, which can be formed at least partially on the device housing 50. For example, the hand riveting device 1 has a handle part 2 which is at least partially formed by the device housing 50. The riveting device 1 can be held in the hand by the gripping surface 2.1 or the handle part 2, when it is positioned on a workpiece for setting a blind rivet. The riveting process takes place then by actuating the riveting tool 10 via the drive device 30.

A preferably replaceable electrical energy storage device, such as an accumulator 3, can be provided for the electrical energy supply of the drive device 30, which energy storage device is arranged, for example, in the region of an end of the handle part 2 facing away from the riveting tool 10. Therefore, the riveting device 1 can be a cordless tool.

Instead of the riveting device 1 for a blind rivet described here as an example, the device housing 50 with its at least one bearing housing 34 or 34' or 40 or 40' or 42 or 42' formed on it can also be used on a riveting device for a blind rivet nut or on a riveting device for a blind rivet screw for the radial mounting of the spindle gear 32 and/or of the at least one reduction stage 37 or 37' and/or of the electric motor 31. A reduction of components and/or a reduction of the weight of the riveting device is achieved by such a device housing. Fundamentally, all components of the riveting device are mounted directly on the device housing, preferably excluding the above-described axial bearing for receiving axial forces of the spindle gear.

Figure 6:
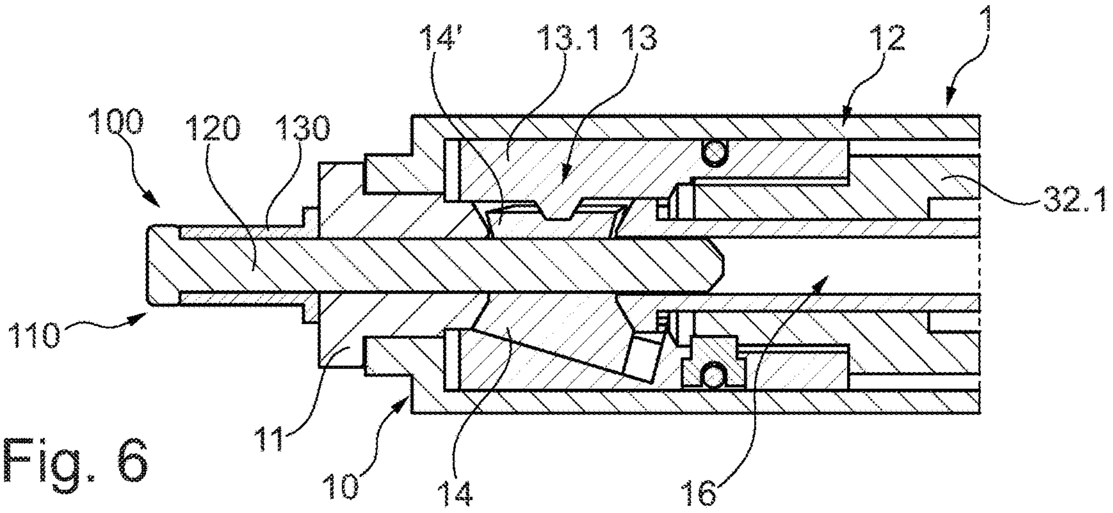

FIG. 6 shows an example of a possible embodiment of a blind rivet setting tool 100. The blind rivet setting tool 100 has the construction of the above-described exemplary riveting device 1, with only a section of the exemplary riveting device 1 being shown in the region of the riveting tool 10 in FIG. 6 for simplicity. In the blind rivet setting tool 100, a rivet mandrel 120 of a blind rivet 110 is inserted into the mouthpiece 11 and received in the mandrel holder 13, in particular the chuck housing 13.1, and fixed in the axial direction, for example by the at least one clamping element 14 or 14'. FIG. 6 shows the blind rivet 110 in the state before riveting, in which the rivet body 130 of the blind rivet 110 is still in its initial state.

Figure 7:
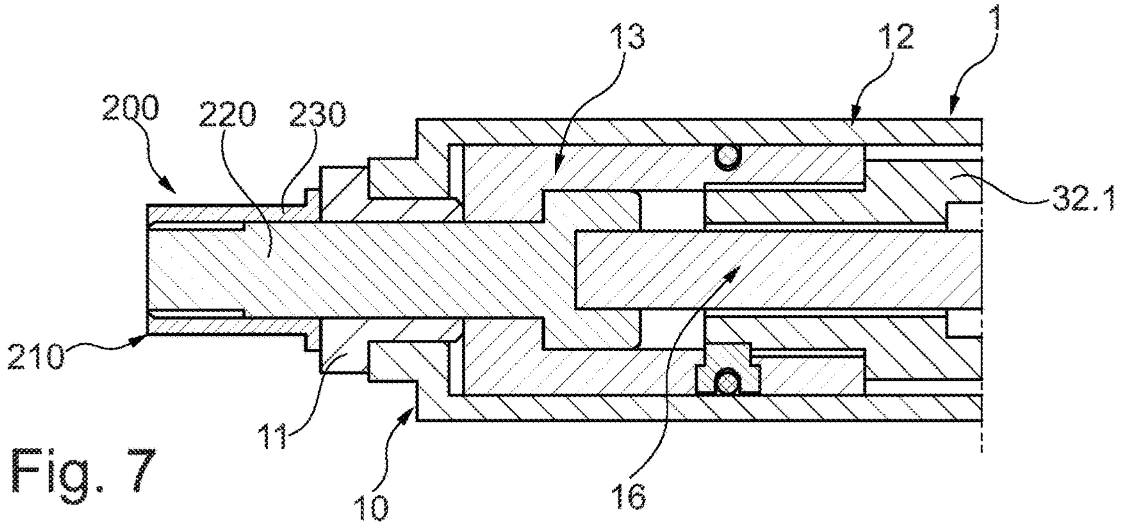

FIG. 7 shows an example of a possible embodiment of a blind rivet nut setting tool 200. The blind rivet nut setting tool 200 has the construction of the above-described exemplary riveting device 1, wherein the mandrel holder 13 and the pressure part 16 are modified with regard to a rivet mandrel for a blind rivet nut and the rivet mandrel is a threaded rivet mandrel. For example, the pressure part 16 has a function there with regard to threading the threaded rivet mandrel into the blind rivet nut. In FIG. 7, only a section of the riveting device 1 is shown in the region of the riveting tool 10 for simplicity. With the blind rivet nut setting tool 200, a threaded rivet mandrel 220 for a blind rivet nut 210 is received in the mandrel holder 13. FIG. 7 shows the blind rivet nut 210 in the state before riveting, in which the rivet body 230 of the blind rivet nut 210 is still in its initial state.

Figure 8:
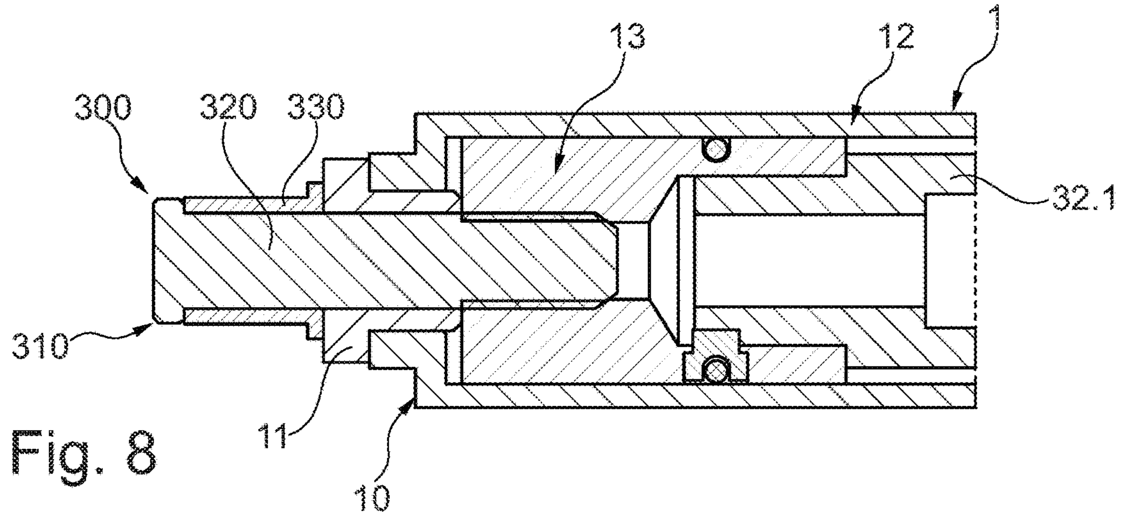

FIG. 8 shows an example of a possible embodiment of a blind rivet screw setting tool 300. The blind rivet screw setting tool 300 has the construction of the above-described riveting device 1, wherein the mandrel holder 13 is modified with regard to a rivet mandrel of a blind rivet screw and the rivet mandrel is a threaded rivet mandrel. In FIG. 8, only a section of the riveting device 1 is shown in the region of the riveting tool 10 for simplicity. With the blind rivet screw setting tool 300, a threaded rivet mandrel 320 of a blind rivet screw 310 is received in the mandrel holder 13. FIG. 8 shows the blind rivet screw 310 in the state before riveting, in which the rivet body 330 of the blind rivet screw 310 is still in its initial state.

REFERENCE NUMERAL LIST

1 riveting device
2 handle part
2.1 gripping surface
3 accumulator
4 tubular element
5 collection container
10 riveting tool
11 mouthpiece
11.1 through hole
12 tool housing
13 mandrel holder
13.1 chuck housing
14 clamping element
14' clamping element
15 spring element
16 pressure part
17 counter holder
30 drive device
31 electric motor
31.1 output shaft
32 spindle gear
32.1 threaded spindle
32.2 spindle nut
33 radial bearing
33' other radial bearing
33.1 outer ring
34 bearing housing
34.1 contact surface
34' other bearing housing
35 axial bearing
36 support ring
36.1 axial end section
37 reduction stage
37.1 gear element
37.2 gear element
37' reduction stage
37.1' gear element
37.2' gear element
38 intermediate shaft
39 radial bearing
39' radial bearing
40 shaft bearing housing
40' shaft bearing housing
41 radial bearing
41' radial bearing
42 shaft bearing housing
42' shaft bearing housing
50 device housing
51 retaining structure
52 housing shell
52' housing shell
53 parting plane
100 blind rivet setting tool
110 blind rivet
120 rivet mandrel
130 rivet body
200 blind rivet nut setting tool
210 blind rivet nut
220 threaded rivet mandrel
230 rivet body
300 blind rivet screw setting tool
310 blind rivet screw
320 threaded rivet mandrel
330 rivet body
W operative axis

The invention claimed is:

1. A riveting device (1), comprising a riveting tool (10); an electromechanical drive device (30); and a device housing (50) which receives the electromechanical drive device (30), wherein the electromechanical drive device (30) has an electric motor (31) having an output shaft (31.1) and a spindle gear (32), wherein the spindle gear (32) is operatively connected to the output shaft, and wherein the spindle gear (32) is configured to convert a rotational drive movement coming from the output shaft (31.1) into a translational drive movement which acts along an operative axis (W) to actuate the riveting tool (10), and wherein the spindle gear (32) is mounted radially in relation to the operative axis (W) via a radial bearing (33) in a bearing housing (34), and wherein the bearing housing (34) is formed on the device housing (50), and the riveting device further comprising a spring element (15), wherein the spring element (15) applies a force to at least one clamping element (14) of the riveting tool (10), and wherein the radial bearing (33) has an axial bearing function for absorbing a counterforce coming from the spring element (15).

2. The riveting device according to claim 1, wherein the bearing housing (34) is moulded onto the device housing (50).

3. The riveting device according to claim 1, wherein the device housing (50) is, at least in a region of the bearing housing (34), a plastic housing which comprises or consists of a plastic material.

4. The riveting device according to claim 1, wherein the radial bearing (33) has a deformation-resistant outer ring (33.1), and wherein the deformation-resistant outer ring (33.1) is held in the bearing housing (34).

5. The riveting device according to claim 1, wherein the radial bearing (33) is supported axially against the bearing housing (34) only in a direction of the counterforce caused by the spring element (15).

6. The riveting device according to claim 1, wherein the spindle gear (32) comprises a threaded spindle (32.1) and a spindle nut (32.2) which is engaged with the threaded spindle (32.1)

wherein the threaded spindle (32.1) is set up to perform the translational drive movement for actuating the riveting tool (10), and wherein the spindle nut (32.2) is mounted by the radial bearing (33).

7. The riveting device according to claim 1, wherein the radial bearing (33) is a deep groove ball bearing.

8. The riveting device according to claim 1, wherein the radial bearing (33) is a thin section bearing.

9. The riveting device according to claim 1, wherein the device housing (50) is in several parts and comprises at least two housing shells (52, 52') placed on each other in a parting plane (53), wherein the operative axis (W) extends in the parting plane (53) or parallel to the parting plane (53), and wherein a peripheral portion of the bearing housing (34) is formed on the respective housing shell (52; 52').

10. The riveting device according to claim 1, wherein at least one reduction stage (37) is interposed between the electric motor (31) and the spindle gear (32), wherein the at least one reduction stage (37) is radially mounted via a radial bearing (39) in a shaft bearing housing (40), wherein the shaft bearing housing (40) is formed on the device housing (50).

11. The riveting device according to claim 1, wherein the riveting device (1) is a hand riveting device and comprises a handle part (2), and wherein the handle part (2) is formed on the device housing (50).

12. A blind rivet setting tool (100), comprising:

the riveting device (1) according to claim 1; and a rivet mandrel (120) of a blind rivet (110) to be set, the rivet mandrel being received in a mandrel holder (12) of the riveting device (1).

13. A blind rivet nut setting tool (200), comprising:

the riveting device (1) according to claim 1; and a threaded rivet mandrel (220) for a blind rivet nut (210) to be set, the threaded rivet mandrel being received in a mandrel holder (12) of the riveting device (1).

14. A blind rivet screw setting tool (300), comprising:

the riveting device (1) according to claim 1; and a threaded rivet mandrel (320) of a blind rivet screw (310) to be set, the threaded rivet mandrel being received in a mandrel holder (12) of the riveting device (1).

* * * * *